Patented Aug. 2, 1927.

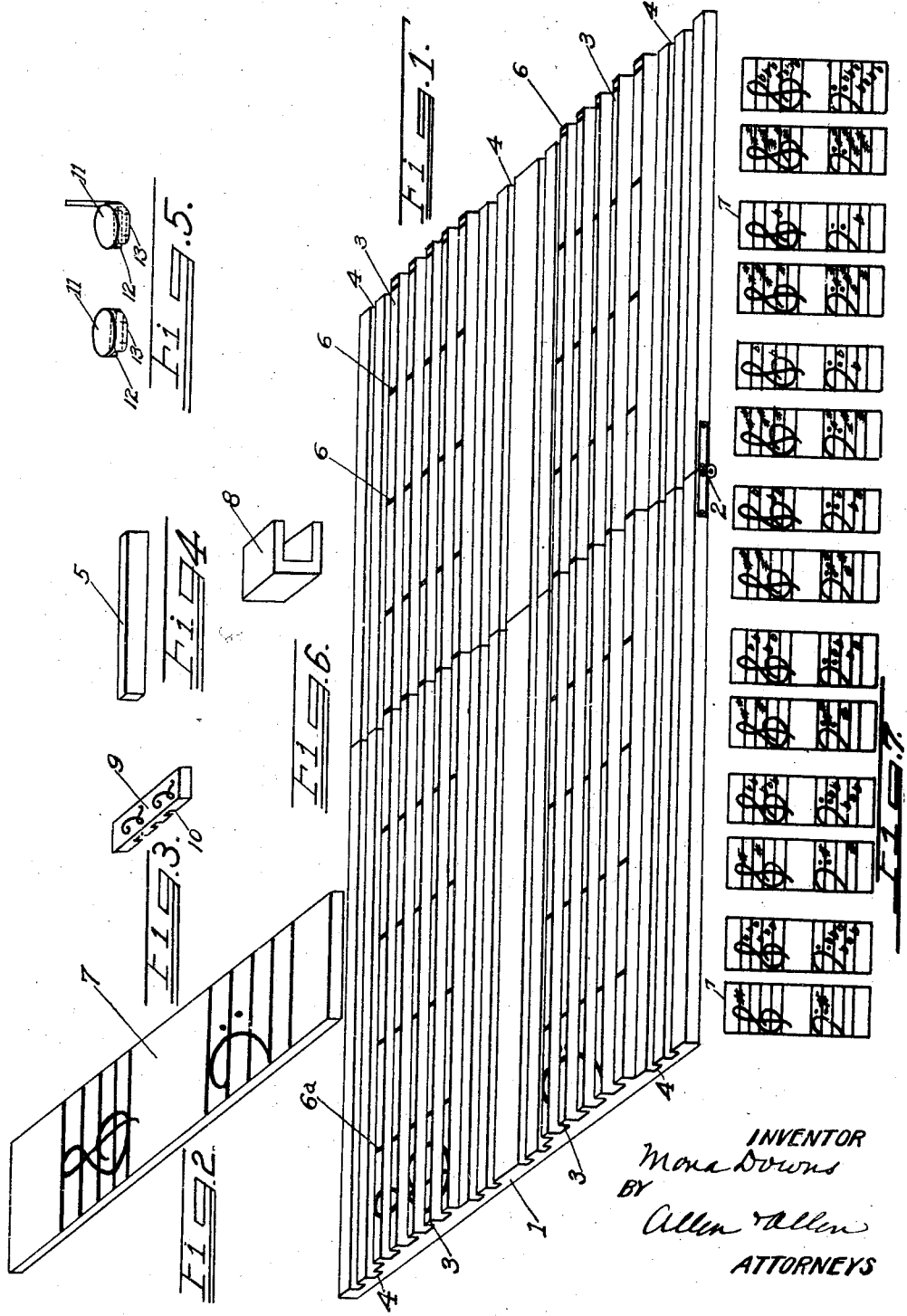

1,637,478

UNITED STATES PATENT OFFICE.

MONA DOWNS, OF GLENDALE, OHIO.

MUSICAL-INSTRUCTION TOY APPARATUS.

Application filed May 20, 1925. Serial No. 31,653.

My invention relates to toy apparatus adapted to instruct a child in the rudimentary principles of musical composition.

Broadly speaking it is the object of my invention to provide toy apparatus for a child's amusement which will have the same relation to a child's musical education as letter blocks have in stimulating a child's interest and instructing the child in the rudimentary principles of words and language.

It is more specifically my object to provide amusement toy apparatus with which a child may play and learn thereby the rudimentary principles of musical composition. It is my object to provide a board with staff and bar lines indicated on the board and to provide pieces adapted to represent notes which may be retained on the board in any desired position with relation to the staff and bar lines.

It is further my object to provide pieces adapted to represent the signatures of the different scales, the time signatures, and the marks designating the manner in which the notes are to be played and to further provide means for securing these pieces to the board.

Musical scales represented by some of the letters of the alphabet, have both sharps and flats and in order to instruct a child in the relationship of the scales bearing the same letter names, it is further my object, as will be hereinafter explained, to provide pieces adapted to represent the different scale signatures bearing complementary letter names on opposite sides of the pieces.

The apparatus which I have provided has as its objective the instruction to a child of the principles of signatures, time, notes, measures, bars, scales, clefs and the principles of harmonization of simple melodies.

Referring to the drawings in which I have illustrated a preferred construction of toy apparatus:

Figure 1 is a perspective view of a suitable board.

Figure 2 is a perspective view of a clef and signature piece.

Figure 3 is a perspective view of a piece adapted to represent the signature of time.

Figure 4 is a perspective view of a piece adapted to retain a note in the grooves on the sides of, and between the staff lines.

Figure 5 is a perspective view of several of the pieces representing musical notes.

Figure 6 is a perspective view of a clamp which may be conveniently used for securing the clef and scale signature pieces in position at the end of the board.

Figure 7 is a plan view of the different complementary scale signatures grouped in accordance with their opposed position on opposite sides of the signature pieces.

Generally indicated at 1 is the board which, as shown, may conveniently be formed of two pieces hinged as shown at 2 so that the two portions making up the board may be folded to fit within a box or other convenient package which may be provided with suitable decorations and which will also contain instructions to the child's parent for the use of the toy apparatus in order to stimulate the child's interest in musical composition. The board is provided with two series of longitudinally raised strips 3, one in the upper and one in the lower portion of the board. These strips are five in number, they are spaced as in musical staffs and they may be formed integrally with the board or secured to the board separately. In order to more nearly resemble a sheet of music I have further provided the portion of the board above, below and between the series of strips with grooves 4 which may be utilized similarly to the raised strips for securing notes to them by inserting the filler pieces 5 in Figure 4 in the grooves.

For purposes of clearness in the drawing I have not shown the raised strips representing the staffs, as being blackened but it will be understood that the raised strips represent the staff lines of a piece of music and resent the staff lines of a piece of music and will in the board when it is ready for use, be marked to represent staff lines on a sheet of music as the staff lines actually appear. The upper set of five lines represent the treble and the lower set of five lines repretreble and the lower set of five lines represent the base in a musical composition. In the board illustrated eight measures are represented by the bar lines 6 disposed vertically on the board in the portion of the board where the staff strips are disposed. The board is also preferably marked with the clef marks indicating the treble and the base clefs as shown in the drawing in Figure 1 in the extreme left hand portion of the board. Separate pieces 7 in Figure 2 are marked with the signatures of different keys and clefs and clamps 8 Figure 6 may be used to clamp any desired signature piece in the portion of the board with the clef marks thereon. The pieces 7 are rectangular in shape and of length equal to the depth of the board and of width sufficient to extend to the first bar line 6ª indicated in Figure 1. Pieces 9 with grooves 10 in their lower part interspaced to fit within the grooves between the staff strips may be marked with the numbers which indicate the time signatures. Pieces 11, which may be formed from integral pieces of wood, and painted, are provided to represent the different notes and a sufficient number will be provided to make any desired musical composition. The pieces 11 have grooves 12 disposed lengthwise through their lower parts so as to form a friction fit over the extended pieces on the board. The lower side edges of the note pieces are also flattened as at 13 Figure 5 to form a wedge like fit between the extended strips 3.

The clef and key signature pieces as indicated in the diagram in Figure 7 have, on opposite sides, the signatures of complementary scales. I have noted that the musical scales as named by each of the letters when played with sharps or flats always add up to the number seven so that by marking the opposite sides of the pieces with the signatures of the letters I have adapted a simple method of instructing the child in this relation, which I have termed a complementary relationship.

When a parent or teacher gives a child the apparatus it is natural for the child to place the note pieces on the raised strips and the instructor then tells the child that the note placed on the board sounds a certain way. The instructor then plays the note which the child has set up, on a musical instrument and the child has its first lesson in the meaning of the note on the bar of music. The board will help the child as it acquires further knowledge and finally, for an older child, the board will provide a simple and interesting working board for composing music.

The complexity of the different pieces adapted to represent other musical marks and signs may, of course, be varied in accordance with the age of the child for whom the apparatus is made. Modifications of the structure will readily occur to those skilled in the art of toy construction without departing from the principle involved in my invention.

Having thus described my invention, what I claim as new and desire to secure by Letters Patent, is:

In combination with a board element marked to represent the staff of a musical composition, pieces adapted to represent the key signatures, and opposite sides of the pieces marked to represent related keys.

MONA DOWNS.